(12) United States Patent
Ding et al.

(10) Patent No.: US 12,353,837 B1
(45) Date of Patent: Jul. 8, 2025

(54) CUSTOMIZABLE FRAMEWORK FOR NATURAL LANGUAGE PROCESSING EXPLAINABILITY

(71) Applicant: Amazon Technologies, Inc., Seattle, WA (US)

(72) Inventors: Haibo Ding, Fremont, CA (US); Lin Lee Cheong, Redwood City, CA (US); Rishita Rajal Anubhai, Seattle, WA (US); Muhammad Bilal Zafar, Berlin (DE); Huzefa Rangwala, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 18/190,321

(22) Filed: Mar. 27, 2023

(51) Int. Cl.
*G06F 40/40* (2020.01)
*G06F 3/0482* (2013.01)
*G06F 40/211* (2020.01)
*G06F 40/284* (2020.01)

(52) U.S. Cl.
CPC ............ *G06F 40/40* (2020.01); *G06F 3/0482* (2013.01); *G06F 40/211* (2020.01); *G06F 40/284* (2020.01)

(58) Field of Classification Search
CPC ....... G06F 40/40; G06F 40/284; G06F 40/211
See application file for complete search history.

(56) References Cited

U.S. PATENT DOCUMENTS

2021/0012404 A1* 1/2021 Kannan ................. G06N 20/00
2022/0067580 A1* 3/2022 Rho ........................ G06F 9/451

OTHER PUBLICATIONS

U.S. Appl. No. 17/535,909, filed Nov. 26, 2021.
U.S. Appl. No. 17/535,942, filed Nov. 26, 2021.
U.S. Appl. No. 17/535,945, filed Nov. 26, 2021.
Das, Dipanjan et al., "Frame-Semantic Parsing", Computational Linguistics, vol. 40, No. 1; 2014; downloaded from http://www.mitpressjournals.org/doi/pdf/10.1162/COLI_a_00163 on Mar. 29, 2023, 48 pages.
Li, Jiwei et al., "Understanding Neural Networks through Representation Erasure", Jan. 2017; arXiv:1612.08220v3, 18 pages.

(Continued)

*Primary Examiner* — Ibrahim Siddo
(74) *Attorney, Agent, or Firm* — Nicholson DeVos Webster & Elliott LLP

(57) ABSTRACT

Techniques for implementing and using a customizable framework for natural language processing explainability are described. A user of a machine learning (ML) service can generate an explainability configuration identifying a user-selected segmented or a user-selected granularity level, from multiple granularity levels supported by the ML service, at which to use for segmenting text during an ML explainability analysis. The ML service can execute a user-configurable explanation pipeline as part of the explainability analysis of at least an input text, including segmenting the input text using the user-selected segmented or a segmentation algorithm corresponding to the user-selected granularity level to yield candidate segments, generating a mask corresponding to the candidate segments, and executing an explanation algorithm based at least on use of the candidate segments and the mask to yield a result.

20 Claims, 9 Drawing Sheets

(56) References Cited

OTHER PUBLICATIONS

Lundberg, Scott M. et al., "A Unified Approach to Interpreting Model Predictions", Nov. 2017; arXiv:1705.07874v2, 10 pages.
Ribeiro, Marco Tulio et al., "Why Should I Trust You?" Explaining the Predictions of Any Classifier, Aug. 2016; arXiv:1602.04938v3, 10 pages.
Sen, Cansu et al., "Human Attention Maps for Text Classification: Do Humans and Neural Networks Focus on the Same Words?", Association for Computational Linguistics, Jul. 2020; downloaded from https://aclanthology.org/2020.acl-main.419 on Apr. 10, 2023, 13 pages.
Sundararajan, Mukund et al., "Axiomatic Attribution for Deep Networks", Jun. 2017; arXiv:1703.01365v2, 11 pages.
Universal Dependency Relations; downloaded from https://universaldependencies.org/u/dep on Mar. 29, 2023, 3 pages.
Vashishth, Shikhar et al., "Attention Interpretability Across NLP Tasks", Sep. 2019; arXiv:1909.11218v1, 10 pages.
Wang, Xinyu et al., "Automated Concatentation of Embeddings for Structured Prediction", Jun. 2021; arXiv:2010.05006v4, 18 pages.

* cited by examiner

US 12,353,837 B1

CUSTOMIZABLE FRAMEWORK FOR NATURAL LANGUAGE PROCESSING EXPLAINABILITY

BACKGROUND

Cloud computing platforms often provide on-demand, managed computing resources to users. Such computing resources (e.g., compute and storage capacity) are often provisioned from large pools of capacity installed in data centers of a cloud computing provider. Users can request computing resources from the "cloud," and the cloud can provision compute resources to those users. Technologies such as virtual machines and containers are often used to allow users to securely share the capacity of computer systems. Some types of services offered by cloud service providers include machine learning services that provide model training, hosting, and related services.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for implementing and using a customizable framework for natural language processing explainability. According to some examples, a machine learning (ML) service in a cloud provider network provides user-customizable machine learning explainability functionalities, such as for natural language processing, that can be tailored to specific user needs and execute more efficiently than existing rigid explainability systems. In some examples, users can easily configure an explainability pipeline, controlling how input text segmentation, mask generation, and/or explanation model execution occurs in a manner that is tailored to the specific use case, avoiding unnecessary or unhelpful computation.

Machine learning model explainability, which can sometimes also be referred to as model interpretability or model transparency, is an important aspect of implementing and using machine learning with high quality. As machine learning models are often made up of various weights, nodes, and the like, their operation is not fundamentally understandable by human minds. Further, the data used as an input to the model, the influence of missing data, and/or the use of unintended or sensitive input variables can all impact a model's performance. Thus, it is difficult to trust a machine learning model without understanding how and why it makes its decisions, and whether these decisions are justified.

Such understanding is crucially important, as a poorly understood model may fail to work properly and further cause negative business or social impacts or even lead to regulatory trouble. Explainability thus is an important aspect for providing quality, fairness, and stability. Moreover, to use machine learning responsibly and to trust it enough to make decisions, it is important to have tools and processes in place to understand how the models are reaching their conclusions.

Figure 1:
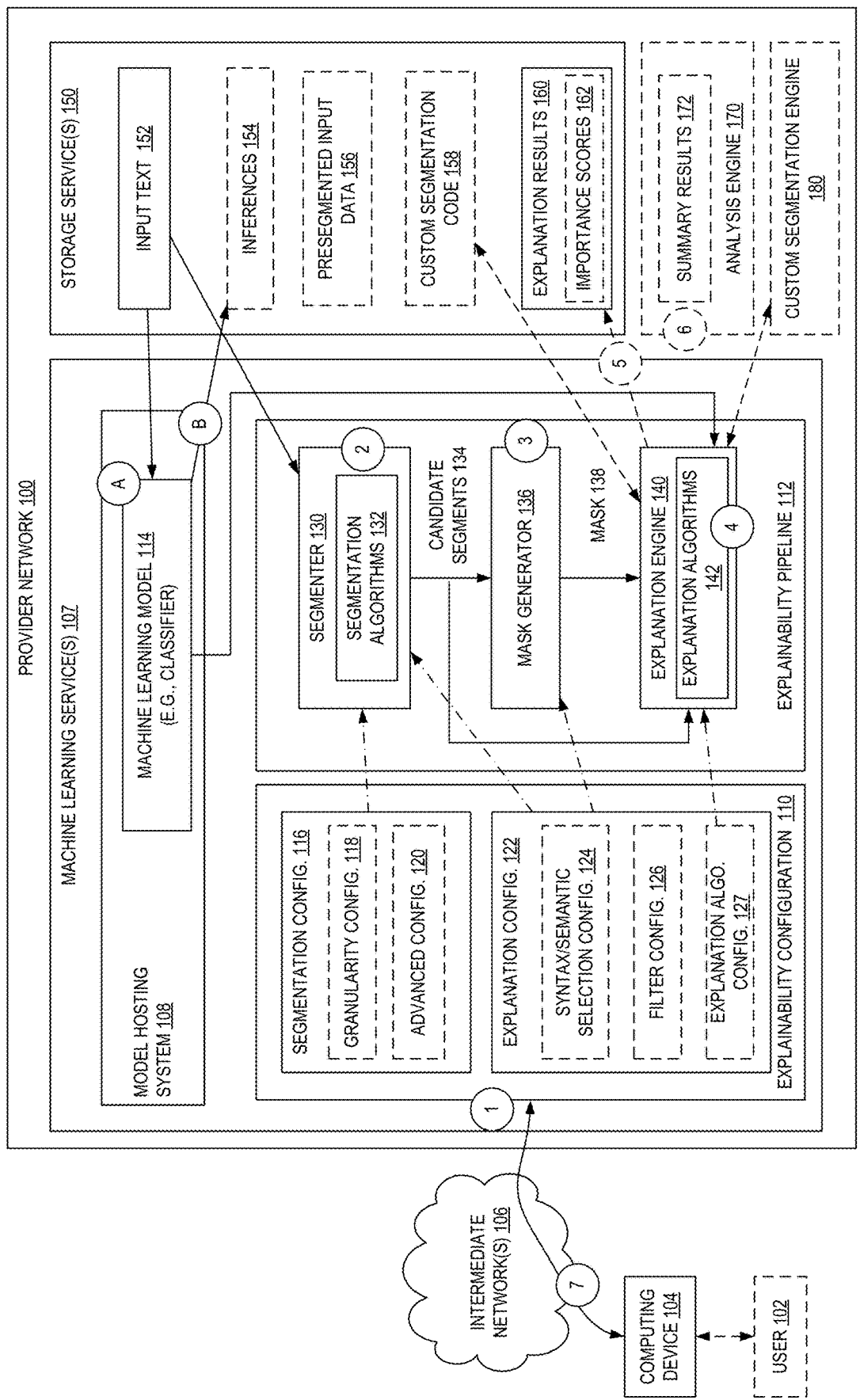
FIG. 1 is a diagram illustrating an environment providing a customizable framework for natural language processing explainability according to some examples.

Examples disclosed herein provide a flexible, powerful, and efficient explainability solution via a machine learning service shown in FIG. 1. FIG. 1 is a diagram illustrating an environment providing a customizable framework for natural language processing explainability according to some examples. In this example, an ML service 107 (or set of ML services) implemented in a provider network 100 enable users 102 to configure an explainability pipeline 112 to perform user-customized explainability analysis. The ML service 107 can be implemented as software, hardware, or a combination of both software or hardware in a centralized or decentralized manner, e.g., across one or more multiple locations using multiple computing devices.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc.

These and other computing resources can be provided as services, such as a hardware virtualization service that can execute compute instances, a storage service that can store data objects, etc. Users 102 (or "customers") of provider networks 100 can use one or more user accounts that are associated with a customer account, though these terms can be used somewhat interchangeably depending upon the context of use. Users 102 can interact with a provider network 100 (via use of a computing device 104 such as a personal computer, laptop, mobile device, server computing device, etc.) across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved. As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

Users (e.g., user 102) of machine learning services 107 may use any of a variety of machine learning services, such as model exploration, development, training, hosting, or the like. As one example, a user 102 may use a machine learning model 114, at circle (A), hosted by a model hosting system 108 to generate inferences for various input data elements, which could be the user's own custom machine learning model or one implemented by the machine learning service 107 itself (e.g., as part of a natural language processing service). For example, a user 102 may wish to use a classifier ML model 114 at circle (A)—such as a sentiment analysis classifier—to analyze input text 152 such as chat transcripts, restaurant reviews, emails, news articles, social media feeds, customer support tickets, or the like, resulting in inferences 154 (at circle (B)) in the form of a sentiment classification (e.g., positive, negative, neutral, etc.). In some examples, the input text 152 and/or inferences 154 are stored in a storage service 150 of the cloud provider network 100, such as an object store, database, or the like, though in some examples one or both can be provided directly by the user 102 (or to the user 102), optionally without any such storage.

This user 102 may also wish to have some sort of explanation, for some or all of the input text 152 elements, indicating why the model 114 produced a particular inference 154. For example, when classifying an input text element with a sentiment, the user 102 may desire an indication of which words, phrases, etc., of the input text contributed to the inference result and to what degree—e.g., why did the model believe a particular product review was negative in sentiment? Practically, this user 102 could be a data scientist wanting to understand the quality of the model, an auditor trying to understand why certain documents are being deemed problematic, a business analyst seeking to understand why certain inferences are made (e.g., why a job applicant is or is not approved to proceed with an interview, why a financial transaction was or was not approved), etc. Further, these users may want explainability for limited amounts of input data (e.g., only for a particular input text 152 element or inference 154 of interest), or for large batches of input text and inferences, perhaps over time.

Some naive explainability systems have been developed to provide some types of explainability insights. However, these systems are limited in terms of which types of explainability they can provide, are extremely rigid (e.g., are limited to analyzing individual words only), and are computationally inefficient and slow. For example, one such system is limited to only examining text on a word-by-word basis, providing subpar results when the user needs an analysis of sentences or phrases.

Further, such systems can be massively inefficient due to the mismatch between the primary use case defining how the system was rigidly built and the myriad use case variations from actual users. For example, an explanation engine may utilize a permutation-based technique whereby words in a sentence are repeatedly swapped out (or changed) and each such modified sentence is then analyzed in-depth. This can work efficient for small sentences or groups of text, but with longer sentences, the amount of computation required to create and test all of these permutations explodes, leading to either extremely slow performance or the need to use so many resources (e.g., scaled out, in parallel) that the necessary computation is extremely resource intensive.

Thus, in examples disclosed herein, a user 102 may provide explainability configuration 110 data to customize an explainability pipeline 112 that can be used to perform an explainability analysis for one or more input text 152 elements accordingly to the needs of the user's use case in a tailored, efficient manner.

To this end, a user 102 can provide explainability configuration 110 information to the ML service 107 to customize the performance of an explainability pipeline in generating explainability information, e.g., explanation results 160. The user 102, via computing device 104, can provide this explainability configuration 110 in a variety of ways, such as by sending or creating a file including the explainability configuration 110, sending data for the explainability configuration 110 via one or more API calls, using a graphical user interface (GUI) of a console of the ML service 107 to create the explainability configuration 110, or the like.

The explainability configuration 110 can include a variety of types of configuration related data. In this example, the ML service 107 supports segmentation configuration 116 and explanation configuration 122 data, though other embodiments can provide further customization possibilities. The segmentation configuration 116 can control how input text 152 is segmented, or broken into smaller pieces for analysis, which can include allowing the user 102 to flexibly control what level of granularity of segmentation is to be performed via granularity configuration 118 and/or provide their own pre-segmented input data 156 or their own segmenter to perform segmentation s (e.g., via custom segmentation code 158 and/or a customer segmentation engine 180) via advanced configuration 120. The segmentation configuration 116, in some examples, can also or alternatively include explanation configuration 122 data, such as how to filter or include candidate segments 134 (created by a segmenter 130) for analysis, such as via syntax and/or semantic selection configuration 124, a filtering configuration 126, and/or an explanation algorithm configuration 127 to select a type or specific explanation algorithm 142 that will best serve their use case, to provide configuration information for the explanation algorithm 142 (e.g., a number of times to run a particular phase, etc.).

Figure 2:
FIG. 2 is a diagram illustrating an exemplary graphical user interface for user-configurable use a customizable framework for natural language processing explainability according to some examples.

As indicated, a user 102 can provide this segmentation configuration 116 in a variety of ways. One example way is via a console type application. One such example is presented in FIG. 2, which is a diagram illustrating a graphical user interface 200 for user-configurable use a customizable framework for natural language processing explainability according to some examples. This graphical user interface 200 can be part of a special-purpose application of the ML service 107 or provider network 100, or can be presented as a web-based application (e.g., a console) via a browser, etc.

As shown, the graphical user interface 200 includes a first "model and input data" section allowing a user to provide an indication (or identifier) of the model 205 used to generate inferences (e.g., an identifier of a model within a model repository, or hosted by a model hosting system 108, an identifier of particular service that uses a model, etc.). This particular model may be used, in some examples, as part of the explanation pipeline as described herein. This first section of the graphical user interface 200 also includes user input elements (here, drop-down boxes) allowing the user to identify the input data 210 (e.g., via a unique identifier of a data object, such as an identifier of a "folder" and/or file in an object store) and to identify the inferences 215. In some examples, though, the user may not identify any inferences 215 as they may not have yet been generated, e.g., inferences may be generated at the same time as the explanations.

The illustrated graphical user interface 200 also includes a second "segmentation configuration" section 225 allowing a user to provide segmentation configuration 116 data. For example, the user may use a "radio button" user input element to select between the use of a built-in (provided) segmenter, the use of user-provided pre-segmented phrases, and the use of a user-provided (or identified) segmenter.

In the case of selecting a built-in segmenter, the user may select or configure a desired granularity for the segmenter via a checkbox user input element 230, here reflecting the selection of "shallow chunks." As described herein, a user can configure the explainability pipeline based on a desired granularity of interest, which both improves the accuracy of the system as well as its performance in terms of time, resource utilization, etc.

For example, different use cases may require explanations with different linguistic granularities. Thus, it may be the case that a user may need to identify important tokens to explain why a short social media post is classified as positive, where another user may want to know what phrases are important for explaining why an email is classified as spam, while another user in the legal industry may want to understand which sections or paragraphs are important indicators in a legal case document being classified as violation. To generate appropriate explanations for different use cases, users can thus configure the system to generate explanations with various different linguistic granularities.

The user may be able to select from a variety of granularities, which could include one or more of the following:

Token: input text is split into individual tokens, and each token is treated as an explanation candidate.

Entity: a named entity recognizer can be applied to input text to split it into a list of spans which can be entities (e.g., person names, organizations, etc.) or others. Each span is an explanation candidate.

Token N-gram: input text is split into a list of non-overlapping N-grams, where N can possibly be defined by the user, and where each N-gram is a span of continuous N tokens.

Shallow Chunk: the input text is split to a list of phrase chunks (see, e.g., "Introduction to the conll-2000 shared task: chunking", Sang et al., 2000) using a shallow parser (see, e.g., "Automated Concatenation of Embeddings for Structured Prediction", Wang et al., 2020). In some examples, each chunk could be a noun phrase (NP), verb phrase (VP), adjective phrase (ADJP), adverb phrase (ADVP), or prepositional phrase (PP).

Syntax Phrase: input text is split into a list of phrases using a syntax tree. For each input sentence, a constituent parsing tree is obtained, and then the tree is pruned at a level where phrases can be obtained at a desirable length, which in some examples can be defined by the user.

Clause: input text is split into a list of clauses using dependency relations such as "csubj" or "ccomp" or "xcomp", etc., (e.g., from the Universal Dependencies (UD) framework known to those of skill in the art) based on dependency parsing, and each clause is treated as an explanation candidate.

Sentence: input text is split into a list of sentences, and each sentence is treated as an explanation candidate.

Paragraph: each paragraph is treated as an explanation candidate. Each paragraph can be split, for example, based on detecting two consecutive newline symbols (perhaps ignoring non-printable symbols, spaces, etc.).

This configuration information, e.g., indicating the user's desired type/granularity of segmentation, together with corresponding options or metadata, can be stored as granularity configuration 118.

Alternatively, the user may select the "bring-your-own" pre-segmented phrases option. In this case, the user may upload (or identify a resource location corresponding to) a set of text inputs that have already been segmented, e.g., by the user or another application, and these segmented phrases are used as explanation candidates. In such cases, the pipeline can skip the segmentation stage, optionally the masking stage (if the user has provided such masking information therewith) and proceed to the explanation engine 140 stage of processing.

As another option, the user may select the "bring-your-own" segmenter configuration. In this example, users are allowed to incorporate their own text segmenter into the explanation pipeline, where this segmenter is used to generate explanation candidates. In some examples, the user can upload (or identify a resource location corresponding to) code or an application implementing a segmenter, as custom segmentation code 158, or provide an identifier (e.g., a unique identifier within the context of the user's account or within the provider network 100 or machine learning service 107) of an already executing (or executable) segmenter (e.g., custom segmentation engine 180), which could be implemented as an on-demand function in a "serverless" on-demand code execution service (e.g., AWS Lambda (TM)), a virtual machine or container implemented by a managed compute service, or the like. Thus, the pipeline can use an existing segmenter (customer segmentation engine 180) or launch a segmenter (using custom segmentation code 158) and use it for the segmentation portion of the pipeline, as opposed to using a built-in segmentation algorithm 132.

This and other types of segmentation configuration 116 information, e.g., indicating the user's desire to use "bring your own" pre-segmented segments or a custom segmenter, can be stored as advanced configuration 120.

In many cases, users may wish for certain candidate segments to be included or excluded from analysis, e.g., by the segmenter stage of the pipeline. To this end, the examiner graphical user interface 200 also includes a third, "explanation configuration" section, allowing a user to provide segmentation configuration 116 data. This section can allow users to indicate whether they wish to incorporate syntax role selection/filtering via checkbox user input element 230, semantic type selection/filtering via checkbox user input element 235, stop word filtering via checkbox user input element 240, and/or non-word symbol filtering via checkbox user input element 245.

For syntax role selection/filtering, the user can select (for inclusion) or filter out specified types of explanations based on syntax roles. In some examples, ones of the following types of syntax roles can be used (and selected via user interface section 250):

Part-of-speech (POS) tagging: target types of explanations can be selected or filtered out using "part of speech" tags or patterns. For example, a user can use individual POS tags such as NOUN, VERB to select only nouns and verbs as candidate explanations.

Dependency relation: target candidate explanations can be selected or filtered out using dependency relations. For example, a user can select (perhaps only) tokens with "nsubj" relation (i.e., a syntactic subject, from the Universal Dependencies framework known to those of skill in the art) as explanation candidates.

Chunk syntax type: explanation candidates can be selected based on syntactic chunk categories described herein with regard to chunking. For example, a user can configure "NP" and "VP" chunk types to select (only) noun phrases and verb phrases as explanation candidates.

For semantic type selection/filtering, the user can select (for inclusion) or filter out based on semantic types of the candidates. In some examples, two semantic types can be selected between for filtering:

Entity Type: explanations can be selected or filtered out based on entity types that the candidate is determined to be, e.g., using a named entity recognition model by the pipeline. In some examples, if the selected explanation granularity is "Entity," the importance of specific types of entities can be investigated, such as "person," "organization names," etc.

Semantic Role: to obtain deeper understanding of specific semantic segments, in some examples the pipeline can also incorporate a semantic parser (see, e.g., "Frame-Semantic Parsing", Das et al., 2014), which allows the user to understand the importance of specific types of semantic roles such as Agent or Recipient roles in a given text input.

A user may also configure, via the third, explanation configuration section, the use of stop word filtering and/or non-word symbol filtering. Via stop word filtering, a user can choose to filter out, from consideration, particular "stop" words (e.g., from a list of words identified, selected, or provided by the user) from the candidate segments. Via non-word symbol filtering, a user can choose to filter out, from consideration, particular symbols such as punctuation marks, monetary symbols, brackets, and/or other non-alpha-numeric symbols, etc. In some examples, the particular included stop words and/or non-word symbols can be updated or modified by the user, to flexibly adapt the working of the pipeline to their particular use case.

In some examples, the syntax role selection/filtering and/or semantic type selection/filtering configuration data can serve as syntax/semantic selection configuration 124, whereas the stop word and/or non-word symbol filtering configuration data can serve as filtering configuration 126. Though not shown here, other types of explainability configuration 110 can also be obtained (from the user) via this or other type of GUI, such an indication of a type or class of explanation algorithm 142 to use, or a particular explanation algorithm 142 itself, which can serve as explanation algorithm configuration 127.

Turning back to FIG. 1, with this explainability configuration 110, the user 102 can cause it to be applied to configure a explainability pipeline 112 for use to generate explainability information for particular input text 152 elements, for batches of input text 152 elements, or on an ongoing basis for future uses of the ML model 114 (e.g., where for some or all uses of the model 114, the pipeline 112 is also executed to generate the explainability information in the form of explanation results 160).

Regardless, for a particular input text 152 under consideration-assuming the user has not configured "bring-your-own segmentation"-α segmenter 130 stage of the explainability pipeline 112 is executed using a segmentation algorithm 132 (e.g., selected based on the user-provided granularity configuration 118) or customer segmentation engine 180 or custom segmentation code 158 (based on advanced configuration 120) at circle (2). This yields a set of candidate segments 134, each being a group of one or more tokens that are order and position sensitive. In some examples, the segmenter 130 also performs filtering and/or selection, e.g., based on the semantic selection configuration 124 and/or filtering configuration 126, to trim down or define which candidate segments 134 are ultimately output. As one example, a phrase "No, I didn't like the movie." could be used by a segmenter 130 to result in candidate segments of "No" and "I" and "didn't like" and "the movie", where the comma and period may have been filtered out.

These candidate segments 134 can be used by a mask generator 136, at circle (3), to generate a mask 138. An explanation mask can be a data structure that can be used to group individual tokens as a single interpretable candidate (for the explanation engine 140). Continuing the example, a mask could be [0, X, 1, 2, 2, 3, 3, X], where tokens corresponding to each number are grouped together-thus "didn't" and "like" are combined via number "2" and "the" and "movie" are combined via use of number "3." In this case, tokens filtered out are represented by "X" values, though in other examples they can be simply dropped from the candidate segments altogether and would not need to be addressed in the mask.

With the candidate segments 134 (and/or input text 152) and mask 138, an explanation engine 140 can execute an type or specific explanation algorithm 142 (which may be selected based on user-provided explanation algorithm configuration 127) at circle (4) to generate explanation results 160 (e.g., importance scores 162). As other examples, the explanation engine 140 may obtain custom segmentation code 158 and execute it to implement a segmenter for use (as a custom segmentation engine), or send a request to a separate service of the provider network 100 to execute or call a user-selected custom segmentation engine 180 (e.g., to an engine implemented using a virtual machine instance managed by a hardware virtualization service, to an on-demand code execution service that executes a function that implements the custom segmentation engine 180, etc.).

To further provide flexibility into the explanation pipeline, the explanation engine 140 can be designed to be compatible with several different types of explanation algorithms/models, such as feature ablation models, perturbation-based methods (e.g., KernelSHAP, LIME), gradient based methods (e.g., Integrated Gradient), attention-based methods, and other techniques known or derivable to those of skill in the art. In some examples, ones of these explanation algorithms 142 may make use of the ML model 114 used to generate the inference 154, and thus the model (or an identifier thereof) can also be an input to the explanation engine 140 for its use.

For further understanding, some types of explanation methods that could be used are briefly explained below:

A feature ablation model, such as "Leave-one-out" (see, e.g., "Understanding Neural Networks through Representation Erasure", Li et al., 2016) probes black-box models by observing the prediction probability change when an input feature is replaced with a given baseline value (e.g., 0) or the feature is erased.

A perturbation-based method (e.g., "LIME", by Ribeiro et al., 2016) trains a local linear regression model (called a surrogate model) on sampled data with each feature (such as a token) removed to estimate individual feature contribution. Another perturbation-based method, such as KernelSHAP (see, e.g., Lundberg and Lee, 2017) uses a linear regression model as a local surrogate model to estimate Shapley values, which allows more efficient computation of Shapley values. An Integrated Gradient (IG) approach estimates feature importance based on feature gradients (see, e.g., "Axiomatic Attribution for Deep Networks", Sundararajan et al., 2017). Specifically, feature importance can be computed by integrating the gradient along the path from a baseline (e.g., a sequence with all zero embeddings) to the original input.

Attention based methods can be used which compute feature importance based on attention weight from base classification models (see, e.g., "Attention Interpretability Across NLP Tasks", Vashishth et al., 2019; see also "Human Attention Maps for Text Classification . . . ", Sen et al., 2020). Attention-based explanation methods are applicable to attention-based text classification models.

However, the explainability pipeline 112 can be adapted to easily allow for the incorporation of other types of explanation algorithm 142 that are later developed, allowing the system to remain relevant over time.

The output of these explanation algorithms 142 can be stored as explanation results 160 at circle (5) and may include importance scores 162 corresponding to individual candidate segments 134. For example, a relatively "higher" importance score 162 can be assigned to a candidate segment that exhibits high influence on the ultimate inference/classification, whereas a relatively "lower" importance score 162 can be assigned to a candidate segment that exhibits low influence—or a "high" negative influence-on the ultimate inference/classification.

Optionally, at circle (6), an analysis engine can analyze a single one of the results 160 or multiple results to generate summaries, visualizations, etc. For example, a month or years' worth of explanation results 160 could be analyzed as part of a high-level global aggregation, e.g., to provide a summary of these—e.g., which words or phrases are most or least important to the inferences, occur the most, etc., which could be shown as a list of positive words/phrases, a list negative words/phrases, etc., for each type of classification, etc. In some examples, a visualization can be provided "on top" of this data to allow users to inspect or comprehend the data differently, e.g., by selecting and displaying the best words that represent your data (i.e., the "strongest" words that help in your discrimination). In one practical example, users could benefit by simply scanning or exploring top keywords from a set of documents involving a particular set of events, as opposed to needing to thoroughly study large numbers of potentially long complex documents.

In some examples, these explanation results 160 and or a set of summary results 172 generated at circle (6) can be provided to the user 102 at circle (7), such as by sending raw data and/or sending data for a user interface to be displayed to the user 102 by the computing device 104 or otherwise utilized by another application.

Accordingly, the explainability pipeline 112 can be flexibly customized based on the needs of the user 102, being fine-tuned to the user's needs for what is important for explainability.

Figure 3:
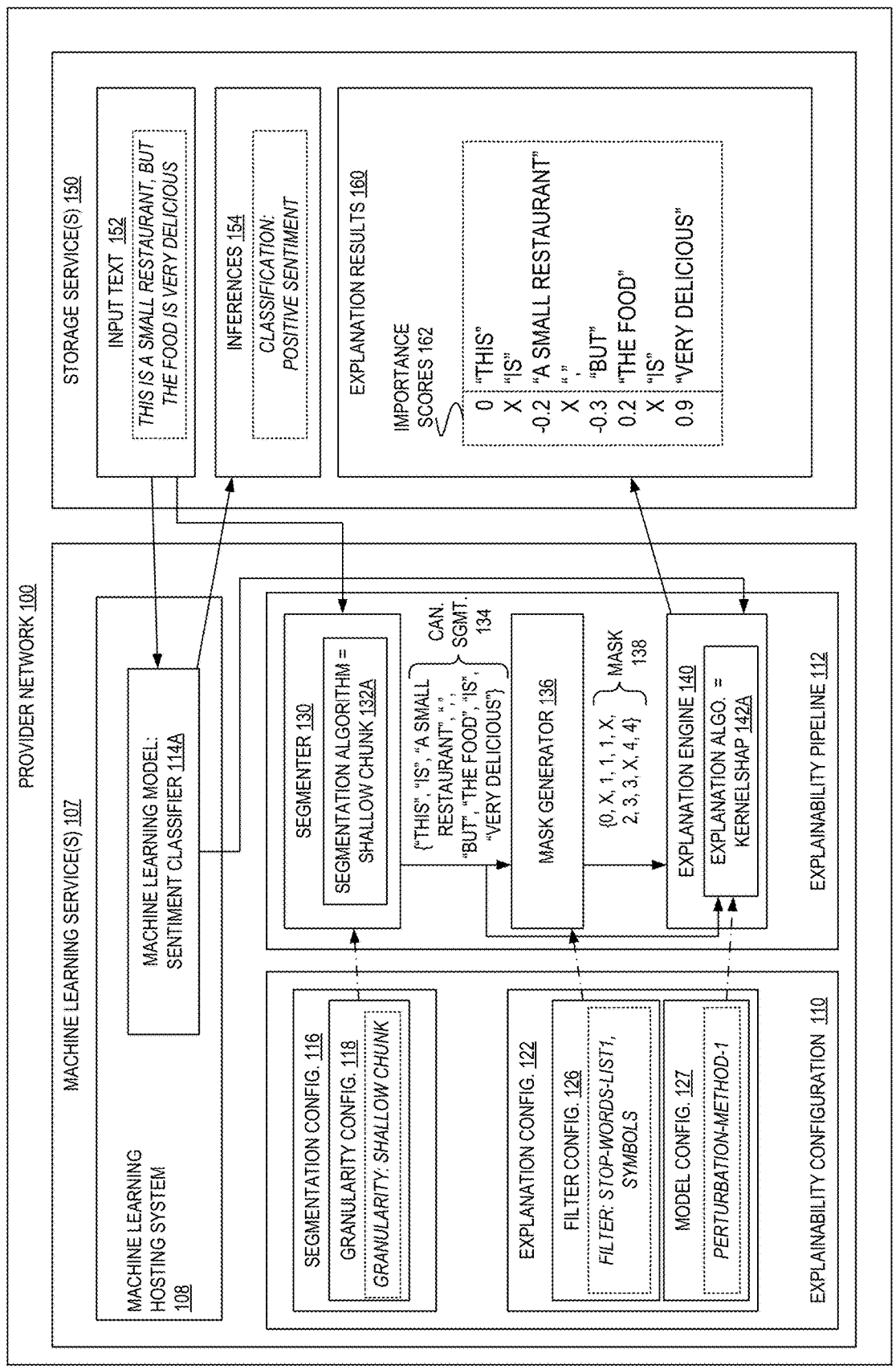
FIG. 3 is a diagram illustrating an exemplary use a customizable framework for natural language processing explainability according to some examples.

For the sake of understanding, a more specific example is shown in FIG. 3, which is a diagram illustrating an exemplary use of a customizable framework for natural language processing explainability according to some examples. In this example, a user 102 has provided explainability configuration 110 data indicating that the user desires for a segmentation granularity of "shallow chunking" as granularity configuration 118, that both stop words and symbols are to be filtered via filtering configuration 126, and that a particular perturbation-based method is to be used for the explanation engine 140.

For a particular input text 152 of "This is a small restaurant, but the food is very delicious", a sentiment classifier model 114A is used to generate a classification inference 154 of "positive" sentiment. The user may seek to determine why this sentiment was reached, and thus may cause the explainability pipeline 112 to execute an explainability analysis on this input text 152 (or, may explore the results from the explainability analysis having already been performed).

Thus, input text 152 is provided to segmenter 130, which selects a segmentation algorithm 132A based on the granularity configuration 118, here selecting a shallow chunk algorithm. This segmentation algorithm 132A results in input text 152 being broken into the following candidate segments 134—"This" and "is" and "a small restaurant" and "," and "but" and "the food" and "is" and "very delicious".

With the candidate segments 134, based on use of the filtering configuration 126, certain stop words and punctuation are filtered from consideration, and thus here the words "is" and the comma (",") are removed, resulting in a mask 138 being generated indicating that "this" and "a small generation" and "but" and "the food" and "very delicious" are considered (based on the "X" values indicating the corresponding segment/token is to be ignored, and based on a common number being used, such as "4", to indicate the corresponding segments/tokens are to be combined.

Thus, the mask 138 and candidate segments 134 or input text 152 are used as inputs, together with the model 114A, to the explanation engine 140, which selects as the explanation algorithm 142A a perturbation method (here, KERNELSHAP) based on the explanation algorithm configuration 127.

This results in the generation of individual importance scores 162, shown as explanation results 160 with a numeric value (here, between negative one and positive one) corresponding to each segment/token and indicating a strength of the corresponding segment/token in leading to the classification sentiment inference 154 of "positive." Here, the phrase "very delicious" is the strongest aspect (due to its importance score of 0.9 being the largest in the set) while the least-strong (or, most negative) portion is the word "but" (due to its importance score of −0.3 being the smallest in the set).

Figure 4:
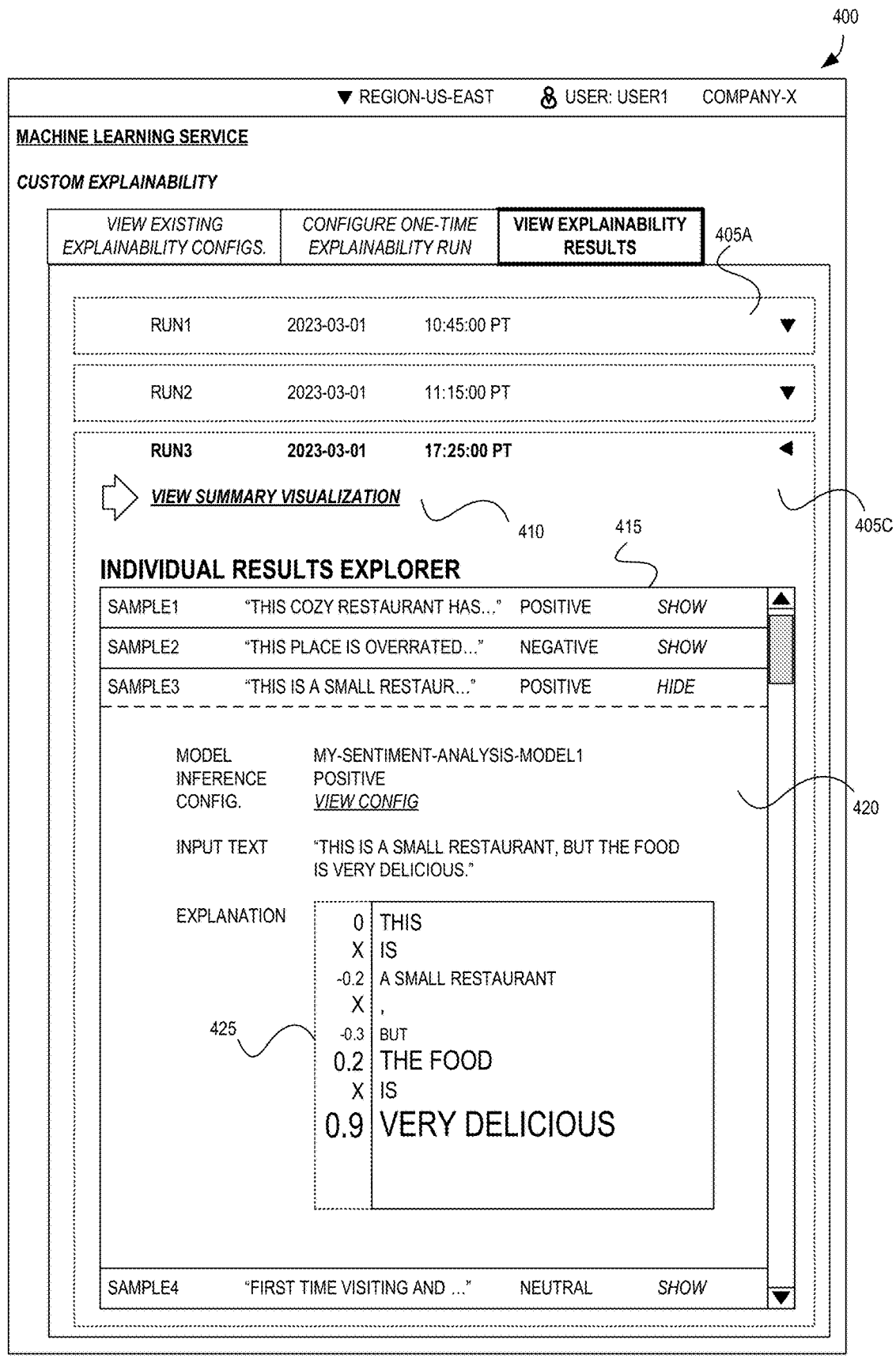
FIG. 4 is a diagram illustrating an exemplary graphical user interface for viewing individual explainability results according to some examples.

FIG. 4 is a diagram illustrating an exemplary graphical user interface 400 for viewing individual explainability results according to some examples. In this example, the graphical user interface 400 has a "view explainability results" tab selected, allowing the user to choose to view individual results from different "runs" 405 of the explainability pipeline 112. Here, a third run ("RUN3") 405C is being explored via an explorer 415 segment of the interface. In this example, each input text 152 from the run can be viewed in detail-here, a heading in the table shows a portion of the input text 152 and its inference/classification. Upon being selected (e.g., via a mouse click), the interface shows more specific details, in portion 420, here indicating the ML model used, the inference, the full input text, and the explanation 425. As shown, the explanation 425 increases the size of the importance score and segment/token the higher the importance score and decreases the size of the importance score and segment/token the lower the importance score. However, many other graphical techniques can be used, such as modifying the color of the segment/token based on its score—e.g., showing more positive values with a darker green and more negative values with a darker red, or the like.

Figure 5:
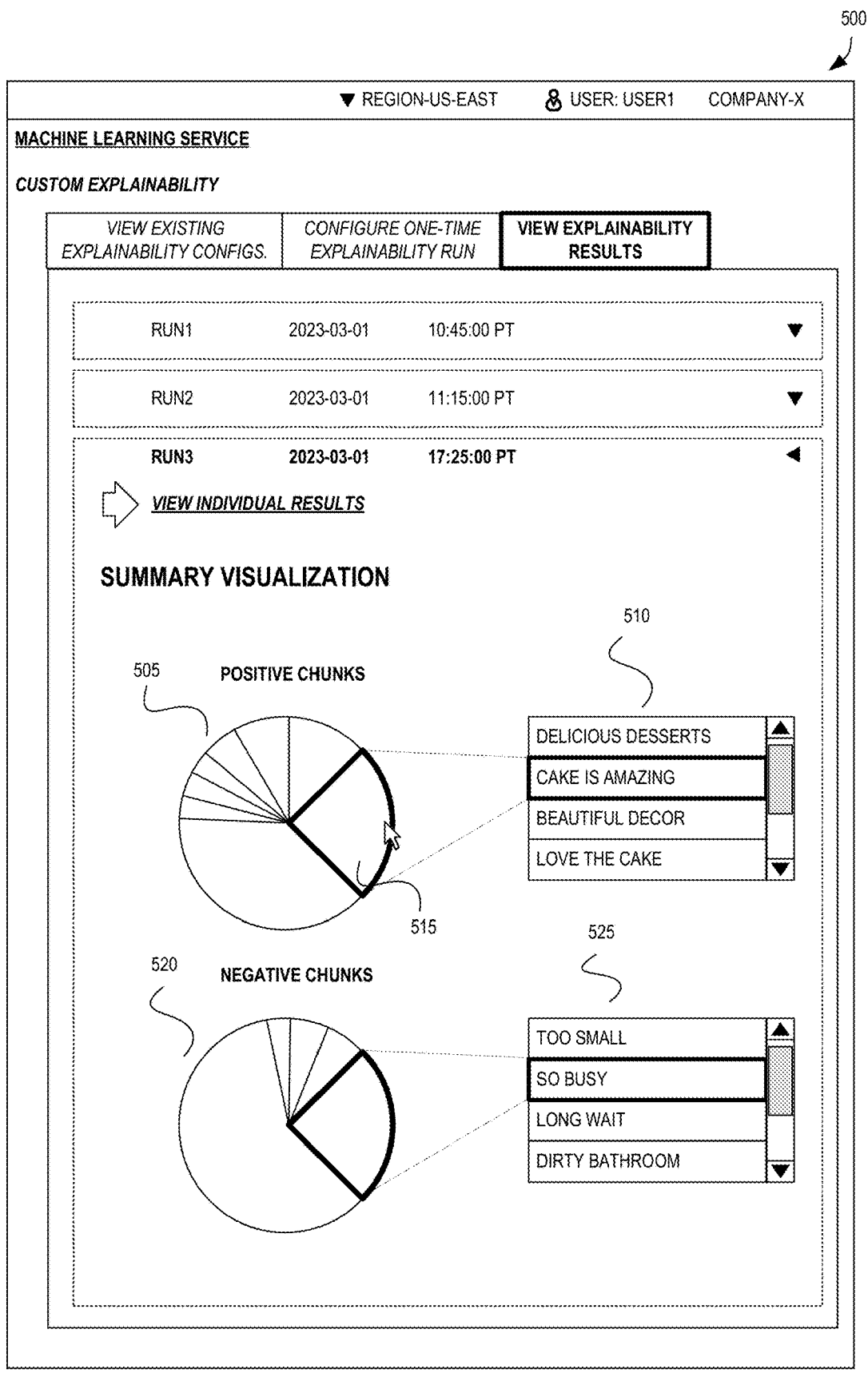
FIG. 5 is a diagram illustrating an exemplary graphical user interface for viewing visualizations and summary explainability results according to some examples.

Alternatively, by selecting "view summary visualization" 410, the user can cause the interface to be updated to show a summary and visualization pertaining to all of the samples from the run. FIG. 5 is a diagram illustrating an exemplary graphical user interface 500 for viewing visualizations and summary explainability results according to some examples. In this example, a pie chart graph 505 shows the relative sizes (e.g., counts, scores, etc.) of the top "positive" chunks, and when a portion of the graph 505 corresponding to a chunk is selected at 515, a list 510 of the top positive chunks can be updated to highlight the corresponding text segment.

Similarly, a pie chart graph 520 shows the relative sizes (e.g., counts, scores, etc.) of the top "negative" chunks, and when a portion of the graph corresponding to a chunk is selected, a list 525 of the top negative chunks can be updated to highlight the corresponding text segment. Of course, many such visualizations and modifications to these shown examples can be implemented by those of skill in the art based on understanding gained from this description.

Figure 6:
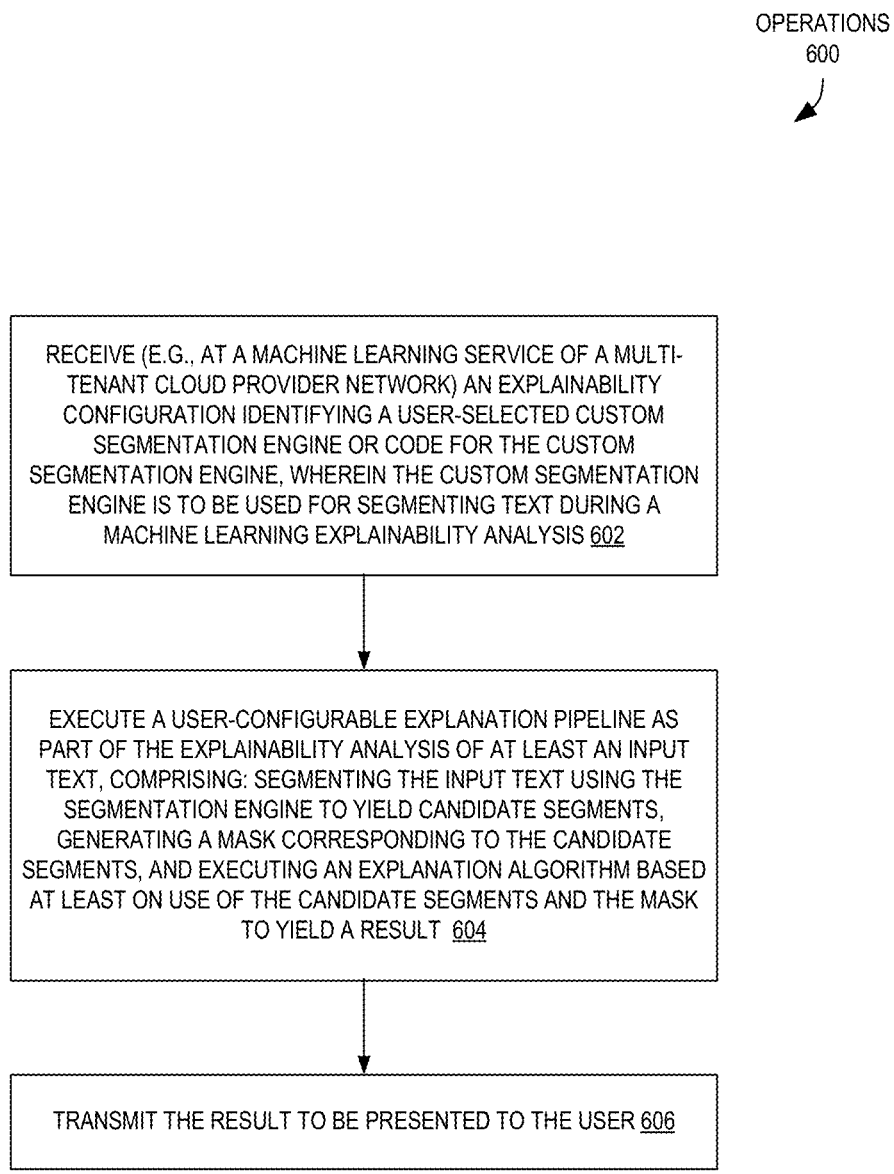
FIG. 6 is a flow diagram illustrating operations of a method for customizable natural language processing explainability according to some examples.

FIG. 6 is a flow diagram illustrating operations 600 of a method for customizable natural language processing explainability according to some examples. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by the ML service 107 of the other figures.

The operations 600 include, at block 602, receiving, at a machine learning service of a multi-tenant cloud provider network, an explainability configuration identifying a user-selected custom segmentation engine or code for the custom segmentation engine, wherein the custom segmentation engine is to be used for segmenting text during a machine learning explainability analysis.

In some examples, the explainability configuration further includes explanation configuration data indicating how to generate the mask, and wherein the generating of the mask is based on use of the explanation configuration data. In some examples, the explainability configuration specifies how to filter or include ones of the candidate segments from use in the explainability analysis.

The operations 600 further include, at block 604, executing a user-configurable explanation pipeline as part of the explainability analysis of at least an input text, comprising: segmenting the input text using the custom segmentation engine to yield candidate segments, generating a mask corresponding to the candidate segments, and executing an explanation algorithm based at least on use of the candidate segments and the mask to yield a result.

The operations 600 further include, at block 606, transmitting the result to be presented to the user.

In some examples the operations 600 further include transmitting data to cause a user interface to be presented to the user, wherein the user interface allows the user to provide pre-segmented data for use as the explanation candidates.

In some examples the operations 600 further include transmitting data to cause a user interface to be presented to the user, wherein the user interface allows the user to select whether to use a segmenter provided by the machine learning service or a custom segmentation engine. In some examples, the user interface, as part of allowing the user to select use of the segmenter provided by the machine learning service, allows the user to select between multiple granularity levels, for segmentation, supported by the machine learning service, the multiple granularity levels including include two or more of: token; entity; token n-gram; shallow chunk; syntax phrase; clause; sentence; or paragraph.

In some examples, the executing of the explanation algorithm is further based on use of a machine learning model, identified or provided by the user, used to generate an inference result for the input text, wherein the explainability analysis is to provide indications of how ones of the candidate segments contributed to the inference result.

In some examples, the explainability configuration includes data specifying how to select the explanation algorithm for use in generating the result.

In some examples, the explanation algorithm is one of: a feature ablation model, a perturbation-based model, a gradient-based algorithm, or an attention-based algorithm.

In some examples, the executing of user-configurable explanation pipeline occurs for a batch of input text elements, the batch including the input text. In some examples the operations 600 further include performing an analysis of results generated by the user-configurable explanation pipeline for the batch of input text elements; and transmitting data, based on the analysis, for a user interface to be presented to the user, wherein the user interface provides a summarization of ones of the results or provides a visualization for the results.

Figure 7:
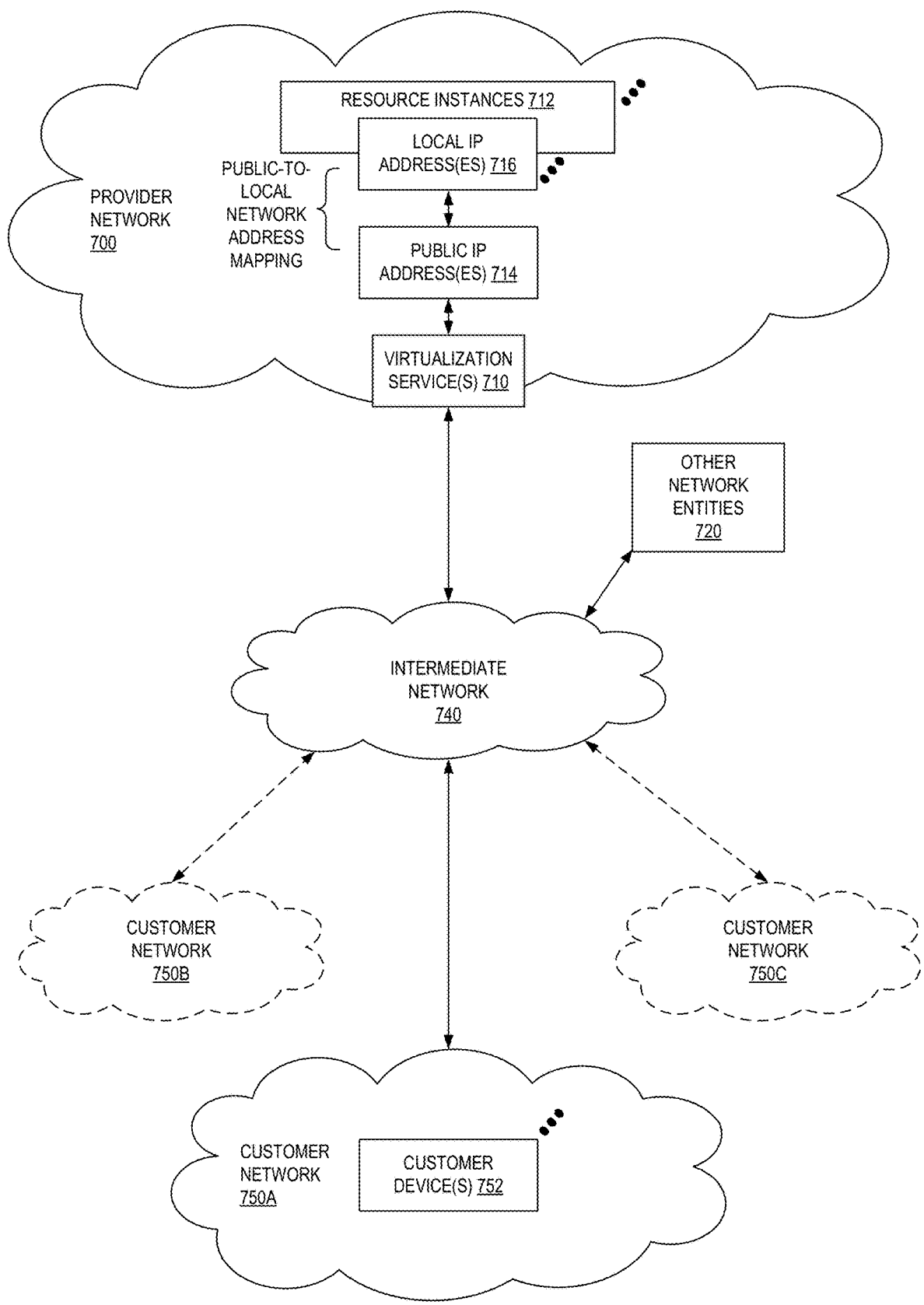
FIG. 7 illustrates an example provider network environment according to some examples.

FIG. 7 illustrates an example provider network (or "service provider system") environment according to some examples. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some examples, the provider network 700 can also provide public IP addresses 714 and/or public IP address ranges (e.g., Internet Protocol version 4 (IPv4) or Internet Protocol version 6 (IPv6) addresses) that customers can obtain from the provider network 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
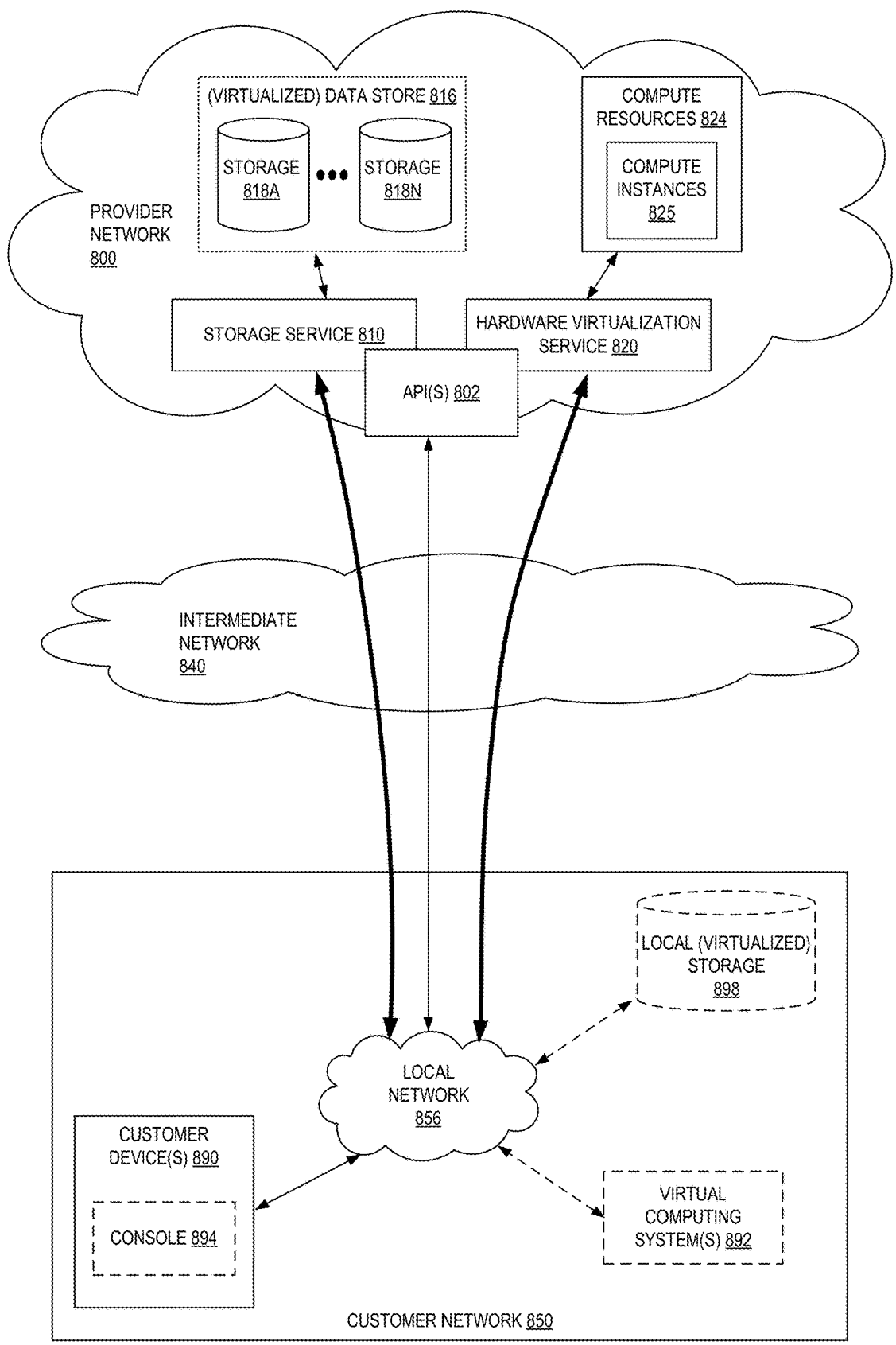
FIG. 8 is a block diagram of an example provider network that provides a storage service and a hardware virtualization service to customers according to some examples.

FIG. 8 is a block diagram of an example provider network environment that provides a storage service and a hardware virtualization service to customers, according to some examples. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
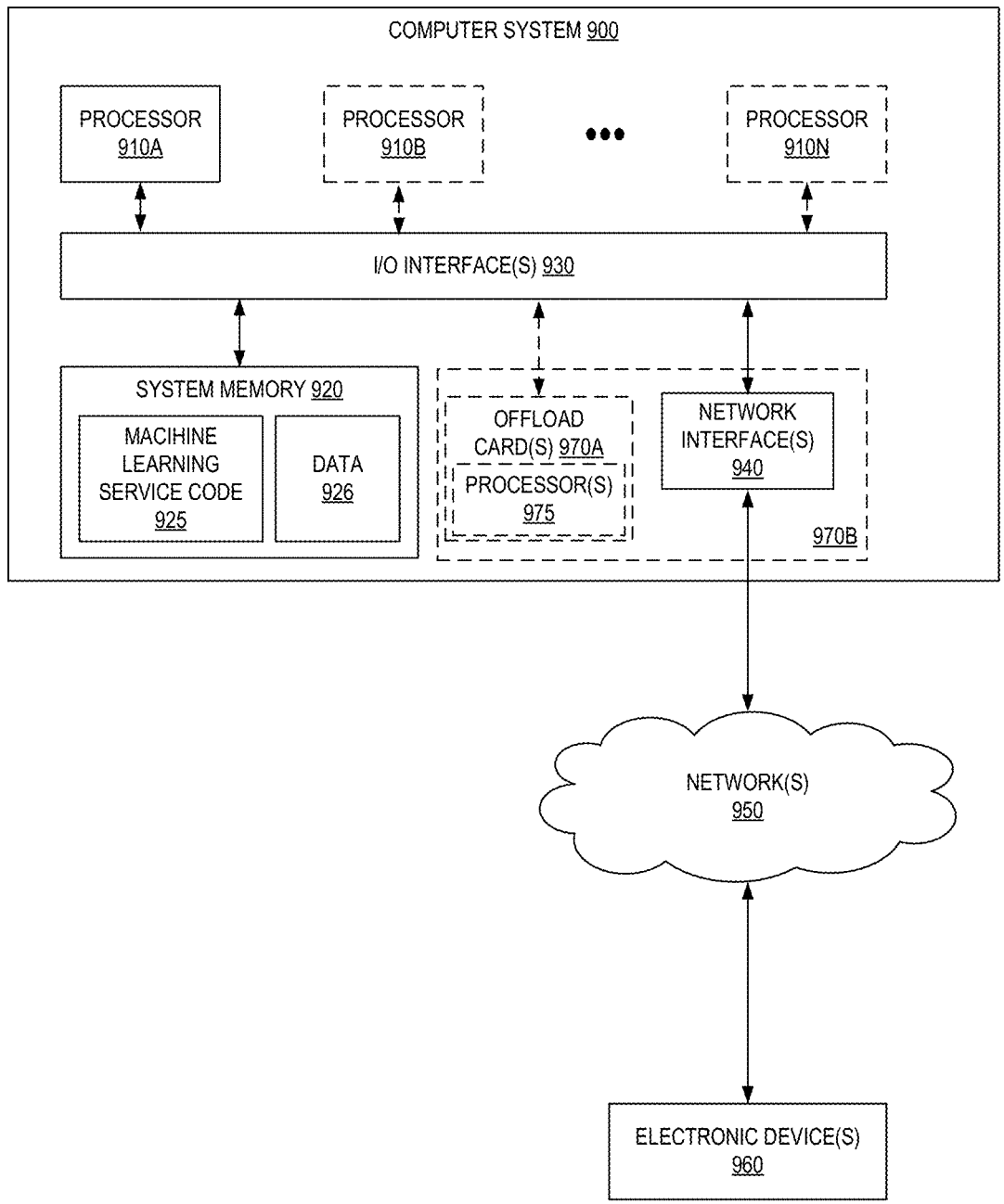
FIG. 9 is a block diagram illustrating an example computer system that can be used in some examples.

In some examples, a system that implements a portion or all of the techniques described herein can include a general-purpose computer system, such as the computer system 900 illustrated in FIG. 9, that includes, or is configured to access, one or more computer-accessible media. In the illustrated example, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various examples the computer system 900 can include one computing device or any number of computing devices configured to work together as a single computer system 900.

In various examples, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as machine learning service code 925 (e.g., executable to implement, in whole or in part, the ML service 107) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computer system 900. However, in some examples the virtualization manager implemented by the offload card(s) 970A or 970B can accommodate requests from other entities (e.g., from compute instances themselves), and cannot coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
transmitting, by a machine learning service of a multi-tenant cloud provider network, data for a user interface to be presented to a user, the user interface including one or more portions allowing the user to provide user inputs for an explainability configuration, wherein the explainability configuration is to control execution of a user-configurable explanation pipeline for a machine learning explainability analysis to analyze classification inferences generated via a machine learning model for a batch of input text elements, wherein the classification inferences each indicate a sentiment of a corresponding input text element, wherein the user interface allows the user to indicate whether to use a segmenter provided by the machine learning service or a custom segmentation engine within the explanation pipeline;
receiving, at the machine learning service, data for the explainability configuration, wherein the explainability configuration identifies a user-selected custom segmentation engine or code for the custom segmentation engine, wherein the custom segmentation engine is to be used for segmenting text during the machine learning explainability analysis;
executing the user-configurable explanation pipeline as part of the explainability analysis for the batch of input text elements, wherein the execution for an input text from the batch includes:
segmenting the input text using the custom segmentation engine to yield candidate segments,
generating a mask corresponding to the candidate segments, and executing an explanation algorithm based at least on use of the candidate segments and the mask to yield a result, wherein the result indicates sentiment scores associated with ones of the candidate segments; and transmitting the result to be presented to the user.

2. The computer-implemented method of claim 1, wherein the user interface, as part of allowing the user to select use of the segmenter provided by the machine learning service, allows the user to select between multiple granularity levels, for segmentation, supported by the machine learning service, the multiple granularity levels including two or more of: token; entity; token n-gram; shallow chunk; syntax phrase; clause; sentence; or paragraph.

3. The computer-implemented method of claim 1, wherein the explainability configuration identifies: a script for the custom segmentation engine, a virtual machine or application executed within the multi-tenant cloud provider network, or a function executed by an on-demand code execution service of the multi-tenant cloud provider network.

4. A computer-implemented method comprising:

receiving, at a machine learning service of a multi-tenant cloud provider network, an explainability configuration identifying a user-selected custom segmentation engine or code for the custom segmentation engine, wherein the custom segmentation engine is to be used for segmenting text during a machine learning explainability analysis;

executing a user-configurable explanation pipeline as part of the explainability analysis of at least an input text, comprising:

segmenting the input text using the custom segmentation engine to yield candidate segments, generating a mask corresponding to the candidate segments, and executing an explanation algorithm based at least on use of the candidate segments and the mask to yield a result; and transmitting the result to be presented to the user.

5. The computer-implemented method of claim 4, wherein the explainability configuration further includes explanation configuration data indicating how to generate the mask, and wherein the generating of the mask is based on use of the explanation configuration data.

6. The computer-implemented method of claim 5, wherein the explainability configuration specifies how to filter or include ones of the candidate segments from use in the explainability analysis.

7. The computer-implemented method of claim 4, further comprising:

transmitting data to cause a user interface to be presented to the user, wherein the user interface allows the user to provide pre-segmented data for use as the explanation candidates.

8. The computer-implemented method of claim 4, further comprising:

transmitting data to cause a user interface to be presented to the user, wherein the user interface allows the user to select whether to use a segmenter provided by the machine learning service or the custom segmentation engine.

9. The computer-implemented method of claim 8, wherein the user interface, as part of allowing the user to select use of the segmenter provided by the machine learning service, allows the user to select between multiple granularity levels, for segmentation, supported by the machine learning service, the multiple granularity levels including two or more of: token; entity; token n-gram; shallow chunk; syntax phrase; clause; sentence; or paragraph.

10. The computer-implemented method of claim 4, wherein the executing of the explanation algorithm is further based on use of a machine learning model, identified or provided by the user, used to generate an inference result for the input text, wherein the explainability analysis is to provide indications of how ones of the candidate segments contributed to the inference result.

11. The computer-implemented method of claim 4, wherein the explainability configuration includes data specifying how to select the explanation algorithm for use in generating the result.

12. The computer-implemented method of claim 4, wherein the explanation algorithm is one of: a feature ablation model, a perturbation-based model, a gradient-based algorithm, or an attention-based algorithm.

13. The computer-implemented method of claim 4, wherein the executing of user-configurable explanation pipeline occurs for a batch of input text elements, the batch including the input text.

14. The computer-implemented method of claim 13, further comprising:

performing an analysis of results generated by the user-configurable explanation pipeline for the batch of input text elements; and transmitting data, based on the analysis, for a user interface to be presented to the user, wherein the user interface provides a summarization of ones of the results or provides a visualization for the results.

15. A system comprising:

a first one or more electronic devices to implement a storage service in a multi-tenant provider network to store input text; and a second one or more electronic devices to implement a machine learning service in the multi-tenant provider network, the machine learning service including instructions that upon execution cause the machine learning service to:

receive an explainability configuration identifying custom segmentation engine or code for the custom segmentation engine, wherein the custom segmentation engine is to be used, for segmenting text during a machine learning explainability analysis;

execute a user-configurable explanation pipeline as part of the explainability analysis of at least an input text, comprising:

segmenting the input text using the custom segmentation engine to yield candidate segments, generating a mask corresponding to the candidate segments, and executing an explanation algorithm based at least on use of the candidate segments and the mask to yield a result; and transmit the result to be presented to the user.

16. The system of claim 15, wherein the explainability configuration further includes explanation configuration data indicating how to generate the mask, and wherein the generation of the mask is based on use of the explanation configuration data.

17. The system of claim 15, wherein the explainability configuration specifies how to filter or include ones of the candidate segments from use in the explainability analysis.

18. The system of claim 15, wherein the machine learning service further including instructions that upon execution cause the machine learning service to:
   transmit data to cause a user interface to be presented to the user, wherein the user interface allows the user to provide pre-segmented data for use as the explanation candidates.

19. The system of claim 15, wherein the machine learning service further including instructions that upon execution cause the machine learning service to:
   transmit data to cause a user interface to be presented to the user, wherein the user interface allows the user to select whether to use a segmenter provided by the machine learning service or the custom segmentation engine.

20. The system of claim 19, wherein the user interface, as part of allowing the user to select use of the segmenter provided by the machine learning service, allows the user to select between multiple granularity levels, for segmentation, supported by the machine learning service, the multiple granularity levels including two or more of: token; entity; token n-gram; shallow chunk; syntax phrase; clause; sentence; or paragraph.

* * * * *